United States Patent Office 3,043,770
Patented July 10, 1962

3,043,770
HYDROCRACKING OF POLYNUCLEAR AROMATIC CONTAINING HYDROCARBON OILS
Fred H. Kant, Cranford, Donald L. Baeder, Fanwood, John A. Hinlicky, Irvington, and Chester L. Read, Westfield, N.J., assignors to Esso Research and Engineering Company, a corporation of Delaware
No Drawing. Filed Nov. 17, 1958, Ser. No. 774,145
4 Claims. (Cl. 208—112)

The present invention relates to the conversion of higher boiling hydrocarbons to a lower boiling, more valuable product. More particularly, the present invention relates to the conversion of a hydrocarbon feed containing polynuclear aromatics to a high yield of high octane gasoline by hydrocracking the feed over a precious metal catalyst carried on acidic supports.

The present invention is concerned with hydrocracking a heavy hydrocarbon feed containing polynuclear aromatics and other complicated multi-ring structures. These aromatics have been found to be extremely difficult to rupture to form low boiling aromatics. Polynuclear aromatic hydrocarbon compounds as well as the hydrocarbons of more complicated multi-ring structure are found in heavy residual fuels from thermal and catalytic cracking. These bottoms are unsuitable for recycling to the usual cracking process because of their refractory nature and because they cause excessive amounts of coke which deposits on the catalyst during conversion. The object of the present invention therefore is to provide the art with a process for converting this specific type hydrocarbon feed.

It has now been found that hydrocarbon fractions containing polynuclear aromatics and boiling between about 350° to 700° F. can be converted to high octane gasoline by hydrocracking these fractions over a precious metal catalyst carried on acid supports. Although hydrocracking with a precious metal catalyst has been disclosed in the prior art, the present invention is concerned specifically with the hydrocracking of a specific type hydrocarbon feed over a specific type catalyst so as to accomplish the rupture of these polynuclear aromatics and thereby obtain unusual and unobvious results. The conversion is carried out in the presence of hydrogen, under a pressure between about 200–1000 p.s.i.g. (pounds per square inch gage) and at a temperature between about 700° and 1100° F., preferably between about 875° and 1050° F. This space velocity is 0.25 to 6 w./hr./w., preferably 0.5 to 3 w./hr./w. The amount of hydrogen introduced into the cracking zone is between about 500 cu. ft. and 10,000 cu. ft., preferably about 1000 and 5000 cu. ft. (measured at standard atmospheric pressure and temperature) per barrel of hydrocarbon feed. Hydrogen is consumed during the reaction and therefore hydrogen must be supplied to the reaction from an external source of hydrogen or a hydrogen-rich gas.

The preferred catalyst of the present invention contains platinum in the range between about 0.001 to 5% platinum, preferably about 0.01 to 1.0% platinum on an alumina support containing from 50 to 100 wt. percent eta alumina. This type of alumina is preferred because of its larger pores. This catalyst can be prepared either by homogeneous impregnation with platinum solutions or by intimately dry mixing in definite proportions, fractions rich in platinum on alumina with quantities of platinum free support. The catalyst can be prepared and used in the form of pellets, extrudates, granules or powder.

One method of preparing high eta alumina content alumina is to hydrolyze aluminum alcoholate with an aqueous solution containing ammonium hydroxide. The aluminum alcoholate may be prepared in any suitable manner. One method of preparation of aluminum alcoholate is given in Kimberlin U.S. Pat. 2,636,865. Aluminum alcoholate is hydrolyzed with good agitation with from about 1 to 10 volumes of ammonium hydroxide solution per volume of aluminum alcoholate, preferably two to three volumes of ammonium hydroxide solution per volume of aluminum alcoholate, the concentration of $NH_3$ being preferably in the range of about 0.3 to 3.4 wt. percent. The temperature of hydrolysis is preferably kept within a range of about 60° to 175° F. Upon hydrolysis an alumina slurry is obtained and this slurry is aged for a period of ½ to 48 hours, preferably 1 to 8 hours at room temperature. The aging is preferably carried out in the range of about 70°–90° F.

The alumina slurry contains alumina in the beta trihydrate form and the slurry is first dried at a temperature of about 200° to 400° F. to remove the ammonia and water to recover dry alumina. Crystalline eta alumina is formed by further dehydrating the beta alumina trihydrate and it has been found that the conversion to the eta form is essentially quantitative when the activating temperature is in the range of about 500°–1450° F. The activation is generally in the presence of air but can be done in the presence of inert gases.

The high eta alumina content alumina is used as a support for platinum and is impregnated with an aqueous solution of water soluble inorganic platinum containing compounds such as chloroplatinic acid, platinum sulfide, etc. The term "water soluble" also includes platinum-containing compounds which form colloidal solutions.

A preferred solution is one containing 15 grams of $H_2PtCl_6 \cdot xH_2O$ (40% Pt) per liter. This strength of solution can be employed to yield catalysts containing about 0.6% platinum but the strength of the solution may be varied to obtain a catalyst containing about 0.01 to 5% platinum weight. The alumina support is impregnated with he platinum solution, is then heated to dryness conveniently at temperatures of about 100°–600° F., preferably about 250° F. at atmospheric pressure, and this results in removal of a substantial portion of the water. Thereafter, the catalyst is calcined at a temperature between about 800° and 1150° F., preferably about 1100° F. The calcining step is preferably carried out for about 1 to 24 hours.

Before impregnating the high eta alumina content alumina base with the platinum compound, it is also within the contemplation of this invention to calcine the alumina and this can be done at a temperature between about 800° and 1450° F. for 1 to 24 hours.

In the present case, it is desirable to treat the platinum catalyst or the high eta alumina content alumina base either before or after calcination with an aqueous dilute mixed acid solution such as one containing nitric acid, perchloric acid, hypochlorous acid or hydrogen peroxide together with a hydrogen halide such as HCl, HF, HI and HBr. The mixture containing nitric acid and hydrochloric acid is preferred. An amount of nitric acid based on the total catalyst of about 0.1 to 8 wt. percent on the total catalyst is preferred. The HCl is employed in an amount of about 1 to 30 wt. percent based on the total catalyst. The nitric and hydrochloric acids are contained in about 50–500 weight percent of water on the total catalyst.

In acid treating the catalyst, the catalyst is mixed with the acid solution, heated to about 150° to 180° F. for at least one hour in a covered container to prevent acid loss, the acid solution is then drained off and the catalyst is washed thoroughly with distilled water. The washed catalyst is then dried at about 250° F. and recalcined for about 1 to 4 hours at between about 800° and 1150° F., preferably about 1100° F.

It is also within the contemplation of this invention to use acidic supports consisting of promoted eta alumina. Activators may be selected from a group consisting of such acid type activators as silica, zinc oxide, zinc chloride, boria and phosphorus oxides. The concentration of the activator preferably lies in the range of 0.5 to 5.0 weight percent of the alumina. Also other precious metals may be substituted for or admixed with platinum. These include palladium, rhodium, iridium, osmium and ruthenium.

The hydrogen containing gas used in the present invention can be once through hydrogen, recycle make gas, or a mixture of hydrogen and a halogen containing gas such as HCl, CCl$_4$, HF or the like.

This invention can be carried out in a fixed bed, moving bed or fluidized catalyst type operation. It is preferred that the conversion take place with regeneration and chlorine treating of the catalyst after each cycle in order to maintain the high activity of the catalyst.

The regeneration of the catalyst may be carried out in a number of ways, but preferably the catalyst is regenerated with air or flue gas. During regeneration, pressures may be between about 0 and 1000 p.s.i.g., and the temperature is maintained at about 800 to 1050° F.

After regeneration, the precious metal catalyst on acid supports is chlorine treated to enhance activity of the regenerated catalyst. Although chlorine is preferred for this treatment, any known, decomposable into free chlorine, non-metallic halide or aluminum halide may be used for this purpose. For best results the halide should be diluted with air during the treating in order to accelerate platinum crystal size reduction and hence enhance activity. It is also preferred to do the treating in an oxidizing atmosphere and this can be accomplished by the introduction of air while chlorine treating. Chlorine treating is especially important in that residual chloride is left on the catalyst thereby making a more active cracking catalyst.

The feed stock for the present invention is a polynuclear aromatic containing hydrocarbon stream boiling between 350° and 700° F. such as hydroformate boiling above 350° F., catalytic naphtha boiling above 350° F. and catalytic cycle stocks boiling above 430° F. Also, extracts of the above streams such as catalytic cycle stock extract taken from the above by using such solvents as sulfur dioxide, phenol, furfural, diethylene glycol, silica gel and the like may be used as feed stock.

In order to explain the invention more fully, the following specific examples are set forth:

Example I

This example illustrates the advantage of hydrocracking over catalytic cracking when the feed is highly refractory and contains polynuclear compounds. The catalyst used in the hydrocracking operation was made by the method just described and contained 0.6 wt. percent platinum on an acid alumina base of 100 wt. percent eta alumina. The catalyst used in the catalytic cracking operation was a conventional cracking catalyst consisting of 13 wt. percent alumina and 87 wt. percent silica.

|  | Catalytic cracking | Platinum hydrocracking | |
|---|---|---|---|
| Feed stock: |  |  |  |
| Gravity, °API | 23.4 | 20.2 | |
| Sulfur, weight percent | 1.45 | 2.64 | |
| A.R. weight percent | 40 | 40 | |
| Analine pt., °F | 128 | 27 | |
| Boiling range, °F. (cycle stock) | 500–750 | 440–560 | |
| Operating cond.: |  |  |  |
| Temperature, °F | 975 | 900 | 965 |
| Pressure, p.s.i.g | 0 | 700 | 700 |
| Feed rate, v./hr./f | 1.0 | 0.25 | 1.2 | 1.1 |
| H$_2$ rate, SCF./B | 0 | 3,500 | 4,000 |
| Process period, hr | 2 | 2 | 1 | 1 |
| Conversion, weight percent | 48 | 65.5 | 48.5 | 65.5 |
| Product dist., weight percent: |  |  |  |
| H$_2$ | } 16.0 | 24.0 | { −0.5 | −1.1 |
| Dry gas |  |  | 3.5 | 12.1 |
| C$_4$ | 6.0 | 10.0 | 4.2 | 5.2 |
| C$_5$/430 | 17.5 | 12.0 | 40.0 | 46.4 |
| 430° F.+ | 52.0 | 34.5 | 51.6 | 34.4 |
| Carbon | 8.5 | 19.5 | 1.3 | 3.1 |
| C$_5$/430 gasoline: |  |  |  |
| Yield, vol. percent | 21 | 14.5 | 46 | 53.5 |
| CFR–RON+3 cc. TEL | 97 |  | 99 | 101.5 |
| CFR–MON+3 cc. TEL | 85 |  | 89 | 95.5 |

Although the same feed is not used for the two compared processes, the data is significant in that the 500–750 cycle stock which was catalytic cracked is a less refractory cracking stock than the 440–560 cycle stock feed which was converted in accordance with the present invention. This is indicated by the much higher aniline point (128° F. v. 27° F.), lower sulfur content, and higher gravity of the 550–750 cycle stock.

The advantages of hydrocracking are apparent from the data. Hydrocracking with platinum on eta alumina catalyst resulted in higher yields, lower coke make and a higher octane product.

Example II

This example illustrates the advantages of converting with a platinum catalyst on high content eta alumina as compared with hydrocracking with a catalyst such as cobalt molybdate on alumina. The platinum catalyst was the same type as used in Example I while the cobalt molybdate catalyst contained about 3 wt. percent cobalt oxide and 10 wt. percent molybdenum trioxide.

|  | Platinum | Cobalt Molybdate |
|---|---|---|
| Feed: |  |  |
| Boiling range, °F | 350–500 cycle stock extract. | 400–530 cycle stock extract. |
| Aromatics, percent | 80 | 85. |
| Process conditions: |  |  |
| Temperature, °F | 975 | 975. |
| Pressure, p.s.i.g | 700 | 800. |
| Feed rate | 1 w./hr./w | 1 v./hr./v. |
| H$_2$ rate, SCF./B | 4,000 | 3,000. |
| Yields: |  |  |
| Gasoline, vol. percent | 38 (C$_5$/350° F.) | 36 (C$_5$/400° F.) |
| RON–I (+3 ml. TEL) | 106.5 | 106. |
| Dry gas, weight percent | 12 | 25. |
| Coke, weight percent | 2.5 | 4.5 |

The above data show a slight increase in octane number with a higher yield, and a reduction of almost half in coke/and also dry gas make. The differences in pressure and hydrogen dilution used do not affect the results materially. Cobalt molybdate was chosen in this comparison since it gave about the best overall results from a variety of non-precious metal oxide catalysts screened.

Example III

This example illustrates the limitation of hydrocracking, even with a platinum on high content eta alumina catalyst. This example indicates that the advantage obtained by hydrocracking, as compared to catalytic cracking, is limited only to a highly refractory, polynuclear aromatic feed and does not include converting gas oils. The catalytic cracking catalyst is 13 wt. percent alumina and 87 wt. percent silica. The hydrocracking catalyst in this case contained 0.6 wt. percent platinum on 100% eta alumina and had been chlorine treated as disclosed above.

| | Hydro-cracking | Cracking |
|---|---|---|
| Feed: | | |
| Gravity, °API | 27.5 | |
| Sulfur, weight percent | 0.17 | |
| AR. weight percent | 10.7 | |
| Boiling range, °F.: | | |
| 20% off at | 670 | |
| 80% off at | 884 | |
| Operating conditions: | | |
| Temperature, °F | 955 | 925 |
| Pressure, p.s.i.g | 700 | 10 |
| Feed rate, v./hr./v | 2 | 1 |
| $H_2$ rate, SCF./B | 5000 | 0 |
| $C_5$/430 gasoline: | | |
| Yield vol. percent | 60 | 51 |
| CFR-RON (3 cc. TEL) | 100 | 99 |
| CFR-MON (3 cc. TEL) | 90 | 85 |
| Other distribution: | | |
| Dry gas weight percent | 8 | 7 |
| $C_4$, vol. percent | 31 | 13.5 |
| 430° F.+ vol. percent | 12.5 | 34 |
| Coke, weight percent | 5.5 | 5 |

It can be seen from this data that by hydrocracking a gas oil to the same octane level as fluid catalytic cracking valuable 430° F.+ material is converted to excess butanes. Coke and dry gas make it about the same and hydrocracking shows an advantage in yield and motor octane but due to the fact that the dry gas and $C_4$ fraction is saturated and that $iC_4/nC_4$ ratio is only 0.6, the overall product value is less for hydrocracking than for catalytic cracking. It is apparent therefore that gas oils and cycle oils, when considering hydrocracking with a platinum catalyst on high content eta alumina are not equivalents.

To recapitulate briefly, the present invention relates to a process for the conversion of high molecular weight hydrocarbons by hydrocracking the hydrocarbons over a precious metal catalyst on acidic supports in the presence of a hydrogen containing gas. This in an efficient technique for converting refractory feed stock, such as catalytic cycle stock and cycle stock extract, into premium gasoline. The precious metal catalyzes the rupture of polynuclear aromatics and thereby produces valuable low boiling aromatics from a very low value, particularly refractory feed. The process not only results in a high octane gasoline product but the presence of relatively high concentrations of alkyl benzenes and naphthalene in the hydrocracked naphtha makes this material attractive as a potential source of chemical raw material.

It is understood that this invention is not limited to the specific examples which have been offered merely as illustration and that modifications may be made without departing from the spirit of the invention.

What is claimed is:

1. A method of converting a hydrocarbon oil feed boiling in the range of about 350° F. rich in polynuclear aromatics selected from the group consisting of heavy hydroformate, heavy catalytically cracked products, heavy cycle stocks from thermal and catalytic cracking and aromatic extracts of these feeds, which comprises hydrocracking said feed at a temperature between about 875° and 1050° F. under a pressure between about 200 and 1000 p.s.i.g. in the presence of platinum on eta alumina produced from aluminum alcoholate as catalyst and at a feed rate of said oil feed between about 0.5 and 3 w.hr./w. in the presence of between about 1000 and 5000 s.c.f. of hydrogen per barrel of said feed thereby converting said feeds to high octane number gasolines in high yields.

2. The method of claim 1, in which the catalyst contains about 0.01 to 1.0 weight percent of the platinum on the eta alumina produced from aluminum alcoholate.

3. The method of claim 1, in which the catalyst after deactivation by carbonaceous deposits is regenerated by burning off the carbonaceous deposits, then treated with a halogen-containing compound and an oxidizing agent before reuse in hydrocracking.

4. The method of claim 1, in which the polynuclear aromatic hydrocarbon oil feed boiling in the range of 350° to 700° F. subjected to the hydrocracking has an aromatic content of at least about 80%.

References Cited in the file of this patent

UNITED STATES PATENTS

| 2,796,326 | Kimberlin et al. | June 18, 1957 |
| 2,902,436 | Mills | Sept. 1, 1959 |
| 2,903,418 | Kirshenbaum et al. | Sept. 8, 1959 |

FOREIGN PATENTS

| 547,017 | Canada | Oct. 1, 1957 |